United States Patent

Sasaki et al.

[11] Patent Number: 5,821,914
[45] Date of Patent: Oct. 13, 1998

[54] APPARATUS FOR DISPLAYING TIME ON A SCREEN

[75] Inventors: Akira Sasaki; Kaname Inomata; Yutaka Chiaki, all of Tokyo, Japan

[73] Assignee: Kabushiki Kaisha Toshiba, Japan

[21] Appl. No.: 763,511

[22] Filed: Dec. 11, 1996

Related U.S. Application Data

[63] Continuation of Ser. No. 181,101, Jan. 13, 1994, abandoned.

[30] Foreign Application Priority Data

Jan. 14, 1993 [JP] Japan .................................. 5-005072

[51] Int. Cl.$^6$ ...................................................... G09G 5/36
[52] U.S. Cl. ................................ 345/133; 368/82; 368/84
[58] Field of Search .............................. 368/82, 83, 84; 348/563, 564, 565; 345/7, 133; 434/30; 40/479

[56] References Cited

U.S. PATENT DOCUMENTS

| | | | |
|---|---|---|---|
| 2,542,021 | 2/1951 | Fox | 368/82 |
| 3,745,671 | 7/1973 | Mortimer | 434/30 |
| 4,707,141 | 11/1987 | Havel | 368/82 |
| 4,767,185 | 8/1988 | Lyons | 40/479 |
| 4,847,696 | 7/1989 | Matsumoto et al. | 358/335 |
| 5,050,105 | 9/1991 | Peters | 345/157 |

FOREIGN PATENT DOCUMENTS

| | | |
|---|---|---|
| 62-66779 | 3/1987 | Japan . |
| 1-107187 | 4/1989 | Japan . |

OTHER PUBLICATIONS

N.Kokado et al., "A Programmable TV Receiver", IEEE Transactions on Consumer Electronics, pp. 69–83, Feb. 1976.

*Primary Examiner*—Richard A. Hjerpe
*Assistant Examiner*—Kent Chang
*Attorney, Agent, or Firm*—Banner & Witcoff, Ltd.

[57] ABSTRACT

A display apparatus enables analog clock display with, for example, twelve numbers 1 to 12 and a pair of long and short hands. In the display apparatus, a control circuit produces instruction data for controlling an on-screen display circuit which generates color signals for displaying an analog clock image. The instruction data causes the on-screen display circuit to change the colors of the two numbers to which the long and short hands point in the analog clock image so that these two numbers are displayed in a different color from those of other ten numbers.

4 Claims, 6 Drawing Sheets

APPARATUS FOR DISPLAYING TIME ON A SCREEN

This application is a continuation of application Ser. No. 08/181,101, filed Jan. 13, 1994, now abandoned.

FIELD OF THE INVENTION

The present invention generally relates to the field of display systems for displaying time on a screen, and more particularly, to a display apparatus which displays an analog clock image on a screen.

BACKGROUND OF THE INVENTION

In a conventional time display (or timer reservation) system which is employed in a display apparatus, such as a VCR or a television receiver, a digital clock is displayed on a screen. However, people who have grown accustomed to using analog type clocks displays find it difficult to quickly read the time from digital clock displays. As a result, they become uncomfortable using the timer reservation system.

FIG. 1 is a diagram showing an example of an analog clock display on a television screen as described in Japanese laid-open patent No. S62-66779. Television screen 81 includes 12 lines and 18 columns (=196) of unit characters 82 with some variations. By arranging these unit characters 82, an analog clock image which has the clock face numbers 1 to 12, the short and long hands, and the center symbol of rotation of these hands is displayed. In this case, the short and long hands are displayed by combinations of further small unit characters.

In addition, Japanese laid-open patent No. S1-107187 describes an example of producing display characters for displaying an analog clock as in FIG. 1.

FIG. 2 is a diagram showing an example of the display configuration of a clock hand on television screen 81 in FIG. 1, and FIG. 3 is a diagram showing one of unit characters 82 in FIG. 2 which includes a plurality of sub-unit characters. In FIG. 2, hand 83 (representing either the short or long hand) is displayed by arranging unit characters 82 in the form of a matrix. In addition, as shown in FIG. 3, one unit character 82 includes, for instance, 8 rows and 8 columns (64) of sub-unit characters 84. Each of sub-unit characters 84 is arranged so that a part of hand 83 is formed by the combination of sub-unit characters 84 having different and distinguishable color (like the shaded dots in FIG. 3) from others.

However, when displaying the short and long hands by combinations of characters, clearance of the shape of each hand depends on both the size of one character and the number of characters. This is liable to cause users to mistake the clock face numbers to which the short and long hands are pointing, for the numbers before or after them.

SUMMARY OF THE INVENTION

It is therefore an object of the present invention to provide an apparatus for displaying an analog clock image in which misleading time indication can be prevented.

Another object of the present invention is to provide an analog clock display apparatus which can accurately show the hour and minute to which short and long hands point.

In accordance with the present invention, a display apparatus displays an analog clock image which has twelve timing symbols representing, for example, the numbers 1 to 12 and a pair of long and short hands. Colors of the twelve timing symbols are designated by control data so that at least one of first and second symbols respectively pointed by the long and short hands are displayed in a different color from other symbols.

The above and other objects of the present invention will become clearer upon an understanding of the illustrative embodiment described below. Various advantages which may not be referred to herein will also occur to those skilled in the art upon employment of the present invention in practice.

DETAILED DESCRIPTION OF THE PREFERRED EMBODMENTS

Representative embodiments of the present invention will now be explained with reference to the accompanying drawings.

Figure 4:
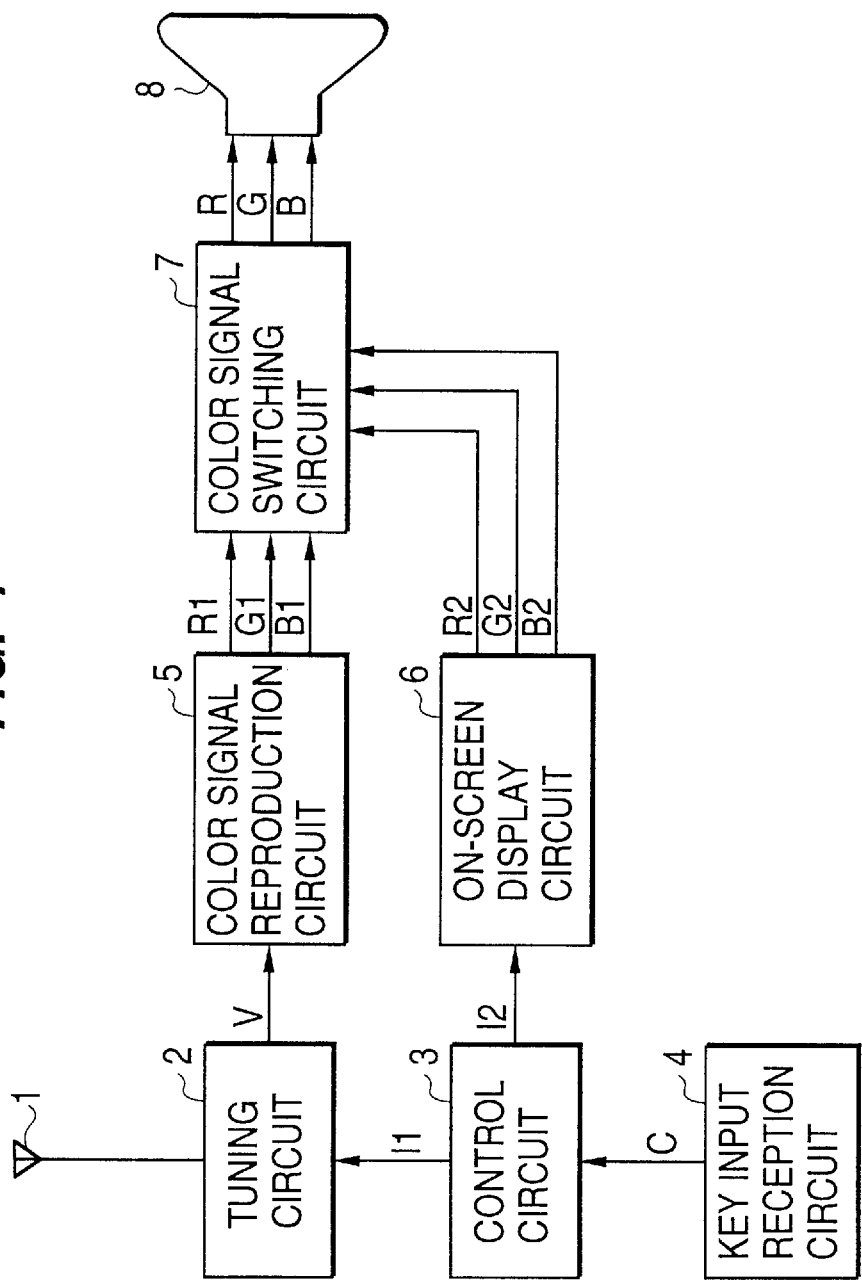
FIG. 4 is a block diagram illustrating a time display apparatus in accordance with an embodiment of the present invention, which is applied to a television receiver.

FIG. 4 is a block diagram illustrating a time display apparatus in accordance with an embodiment of the present invention, which is applied to a television receiver in order to display the present time.

In the display apparatus of FIG. 4, the television signals received by antenna 1 are supplied to tuning circuit 2. In the tuning circuit 2, the video signal corresponding to a desired channel designated by control circuit 3 is selected out of several television signals, and the extracted video signal is amplified. Key input reception circuit 4 is connected with a keyboard, which will be discussed further below, for receiving key inputs from a user and for transmitting command data (C) corresponding to the key inputs to control circuit 3. In response to such command data (C), control circuit 3 which includes a microcomputer supplies instruction data (I1) or (I2) to either of tuning circuit 2 or on-screen display circuit 6, respectively.

The video signal (V) tuned by tuning circuit 2 is supplied to color signal reproduction circuit 5. In the reproduction circuit 5, the video signal (V) is restored to primary color signals of red (R1), green (G1) and blue (B1), and these color signals are supplied to one of the input terminals of color signal switching circuit 7. However, on-screen display circuit 6 generates other primary (color signals of red (R2), green (G2) and blue (B2) for displaying an analog clock image and other on-screen images based on the instruction data (I2). The color signals (R2), (G2) and (B2) are supplied to the other input terminal of color signal switching circuit 7. The color signal switching circuit 7 switches over and outputs the primary color signals supplied from one of color signal reproduction circuit 5 and on-screen display circuit 6, and supplies them to color picture tube 8. Color picture tube 8 displays a color image on the screen based on the primary color signals (R), (G) and (B) supplied from switching circuit 7.

Figure 5:
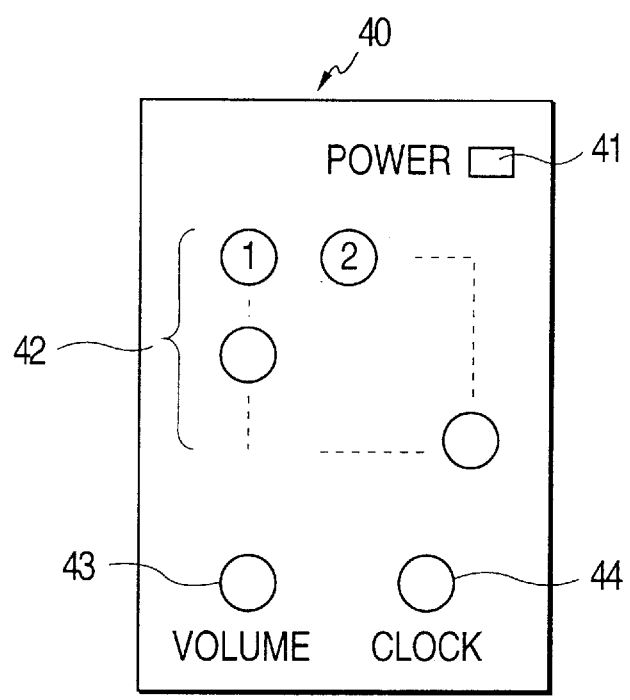
FIG. 5 is an illustration of the keyboard connected with key input reception circuit 4 in FIG. 4.

FIG. 5 is an illustration of the keyboard connected with key input reception circuit 4 of FIG. 4. Keyboard 40 includes power key 41 for switching on and off power source supply, channel keys 42 for designating a channel to be tuned and for designating time displayed on the screen when adjusting the present time, for instance, volume key 43, clock display key 44 for requesting a display of the analog clock image and other keys (not shown) for operating other functions of the television receiver.

Figure 6:
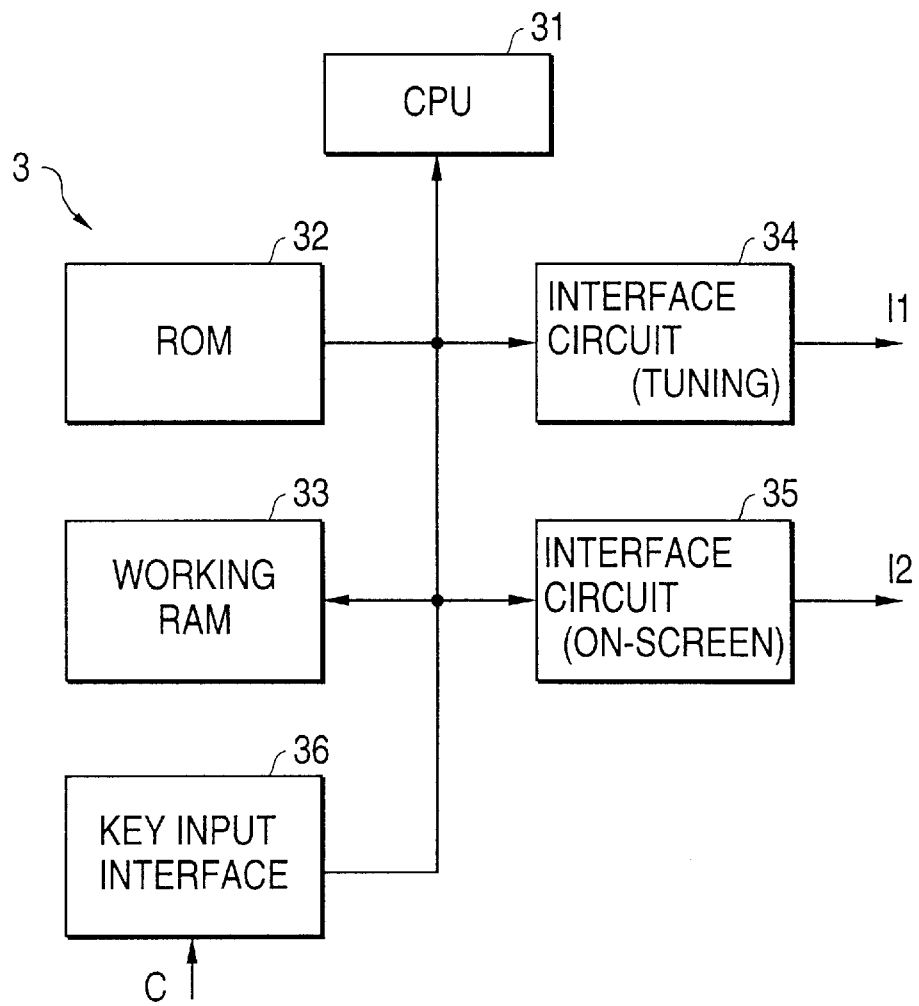
FIG. 6 is a block diagram illustrating the control circuit 3 in FIG. 4 in detail.

FIG. 6 is a block diagram illustrating the control circuit 3 of FIG. 4 of detail. Key input interface circuit 36 receives and temporarily stores the command data (C) supplied from key input reception circuit 4, and then supplies it to central processing unit (CPU) 31. CPU 31 reads out program data from read only memory (ROM) 32 based on the command data (C). In addition, CPU 31 supplies operation data to a buffer of working random access memory (RAM) 33. The operation data of working RAM 33 is processed by CPU 31 according to the program data in order to produce the instruction data (I1) and (I2). The instruction data (I1) and (I2) are provided to interface circuits 34 and 35 for supply to tuning circuit 2 and to on-screen display circuit 6 of FIG. 4, respectively. In addition, CPU 31 includes a clock circuit (not shown) for generating data of the present time which is used for displaying the analog clock image indicating the present time.

Figure 7:
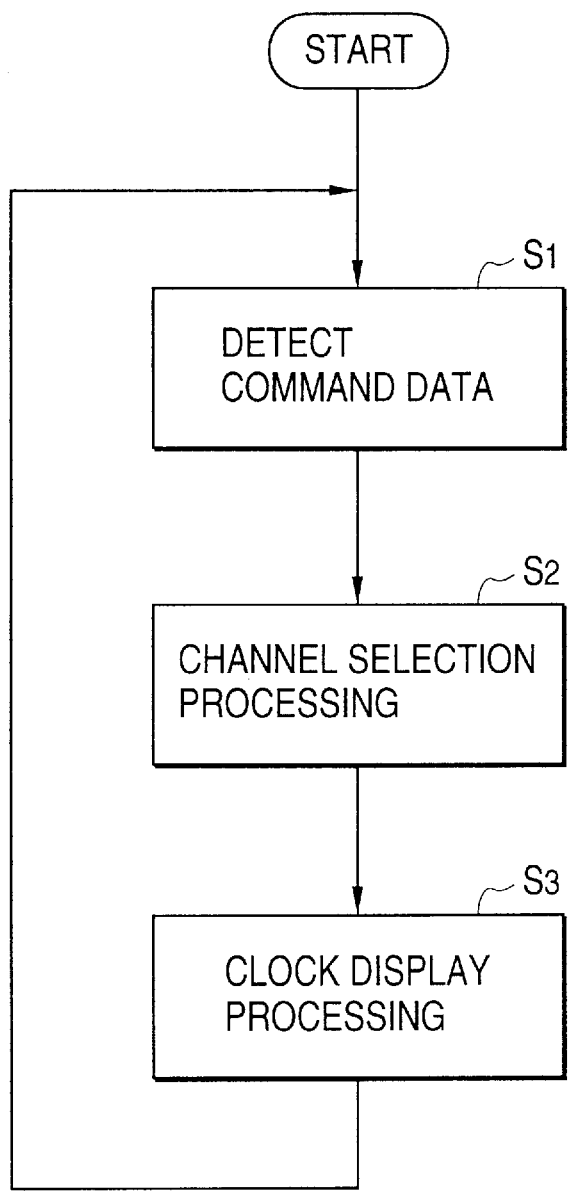
FIG. 7 is a flow-chart for executing basic operations in control circuit 3 of FIG. 6.
Figure 8:
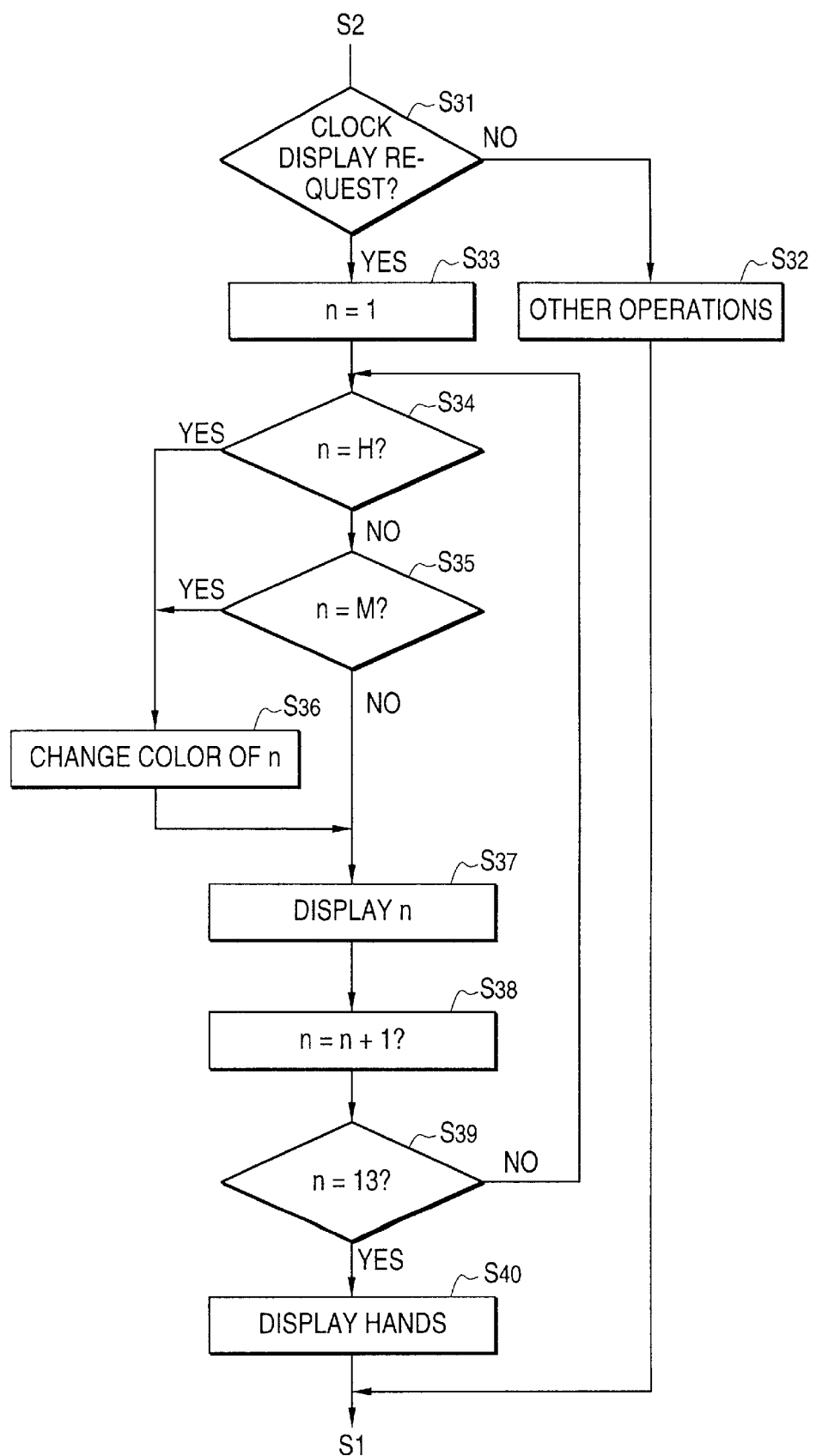
FIG. 8 is a flow-chart for producing the instruction data in order to display an analog clock image in the process of step $S_3$ in FIG. 7.

FIGS. 7 and 8 are flow-charts showing programs for executing basic operations in control circuit 3 of FIG. 6 and for producing the instruction data (I2) in order to display the analog clock image on the display. With reference to FIGS. 4 to 8, the operation for displaying the analog clock image of this embodiment will now be explained.

In step $S_1$, of FIG. 7, CPU 31 in control circuit 3 recognizes the command data (C) supplied from key input interface 36 and produces the operation data for executing specified processing in response to that command data (C). In the case where the command data (C) indicates the selection of channel to be tuned, the process proceeds to step $S_2$ where CPU 31 produces the instruction data (I1). The instruction data (I1) is supplied to tuning circuit 2 via interface circuit 34 and causes tuning circuit 2 to tune in the selected channel. When the command data (C) indicates displaying of analog clock image in response to the operation of clock display key 44, the process proceeds to step $S_3$ where CPU 31 produces and supplies the instruction data (I2) to clock display circuit 6 via interface circuit 35. The instruction date (I2) causes on-screen display circuit 6 to generate the color signals (R2), (G2) and (B2) for displaying the present time. These processes in step $S_1$ to $S_3$ are repeatedly and continuously executed.

Figure 1:
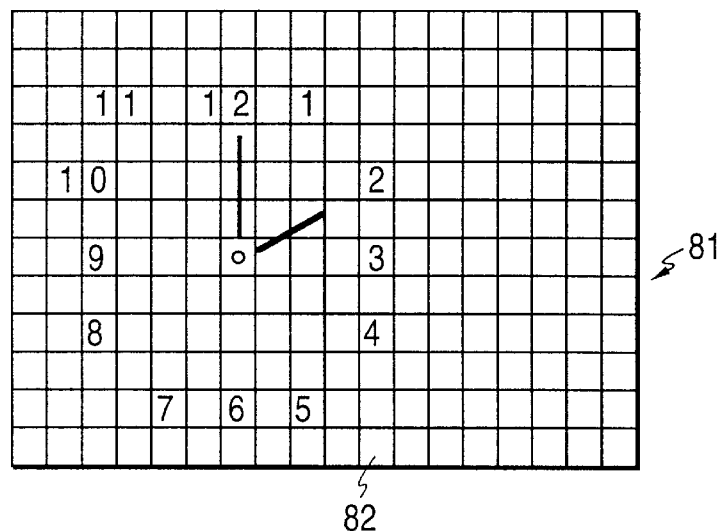
FIG. 1 is a diagram showing an example of an analog clock display on a television screen.
Figure 2:
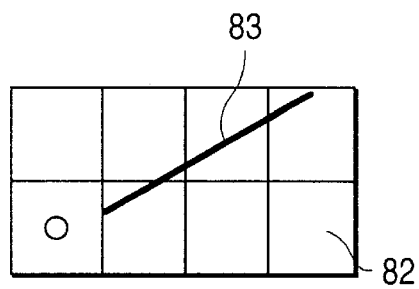
FIG. 2 is a diagram showing an example of the display configuration of a clock hand on television screen 81 in FIG. 1.
Figure 3:
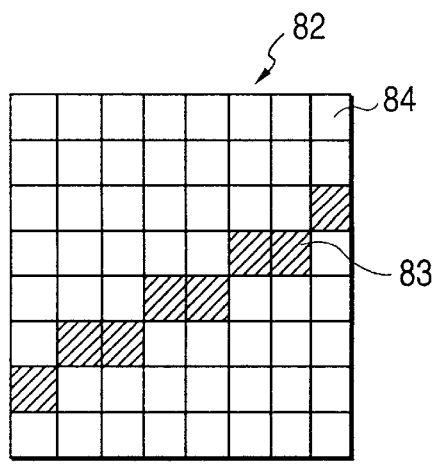
FIG. 3 is a diagram showing one of unit characters 82 in FIG. 2 which includes a plurality of sub-unit characters.

In the flow-chart of FIG. 8 showing the operations in step $S_3$ in detail, a request of analog clock display is detected in step $S_{31}$. If the command data (C) indicates a request for the display other than the analog clock image, the operation in response to that command data (C) is performed in step $S_{32}$. However, when the command data (C) indicates the request for the analog clock display, the operation for displaying the analog clock image, like that of FIG. 1 for instance, is executed as follows. In step $S_{33}$, a variable n, which sequentially represents one of the numbers (1 Lo 12) in the analog clock image is set to "1". In step S34, the variable n is compared with the number H (representing the hour component of time in for example, 12 one hour increments) to which the short hand of the analog clock image points. When n and H match each other, the next process is executed in step $S_{36}$. However, when n and H do not match (in step $S_{34}$), the variable n is also compared with the number M (representing the minutes component of time in 12 increments having five minutes each) to which the long hand points in step $S_{35}$. The next process is executed in step $S_{36}$ when n and M match each other, while step $S_{37}$ is executed when n and m do not match.

In step $S_{36}$ the color of the character which is used for displaying the variable n in the analog clock image is changed to a color distinguishable from those of the other numbers. In step $S_{37}$, CPU 31 produces the instruction data (I2) in regard to the character for variable n. As a result, when the variable n matches with the number H or M, the instruction data (I2) indicates the change of the color for the variable n.

In the next step $S_{38}$, the variable n is set equal to n+1. Then the variable n is compared with a predetermined reference number, e.g., 13, in step $S_{39}$. If n does not equal 13 (i.e., n<13), the process returns to $S_{34}$. If n equals 13, the process proceeds to step $S_{40}$. In step $S_{40}$, CPU 31 produces the instruction data (I2) in regard to the short and long hands to be displayed.

By the above processes, on-screen display circuit 6 generates such the primary color signals (R2), (G2) and (B2) such that the colors of the numbers H and M are different from those of others. For instance, referring to the analog clock image in FIG. 1, the numbers 2 and 12 are in red while other numbers 1, 3 to 10 and 11 are in white. Otherwise, the numbers 2 and 12 may respectively be in red and green, but other numbers are in white. Thus, according to this embodiment, the time designated by the short and long hands is made distinct even if the shapes of these hands are not clear, so that misunderstanding by the users can be eliminated.

While the above embodiments are applied to television receivers, the present invention may be applied to other applications, such as video cassette recorders with timer reservation functions and computer monitor systems. In addition, the present invention may be used to display an analog clock image having any type of configuration, such as configurations that do not have numbers on the clock face, that use for example, 24 hour increments, that use for example 60 minute increments, or any combination of the foregoing.

As described above, the present invention provides an apparatus for displaying an analog clock image so that misleading time indication can be prevented. In addition, the present invention provides an analog clock display apparatus which can accurately show the hour and minute to which short and long hands point.

While the present invention has been illustrated and described in detail in the drawing and foregoing description, it will be recognized that changes and modifications can and will occur to those skilled in the art. It is therefore intended by the appending claims, to cover any such modifications as fall within the true spirit and scope of the invention.

We claim:

1. A display apparatus for displaying an analog clock image providing a time indication. comprising:

control means for generating control signals representing an arrangement of timing symbols and long and short hands of an analog clock image, said control signals including color signals for the timing symbols, wherein the color signals for the timing symbols to which the long and short hands point specify a different color than the color signals for the remaining timing symbols; and display means, responsive to the control signals, for displaying the analog clock image such that the colors of the timing symbols to which the long and short hands point are different from the colors of the remaining timing symbols wherein said control means comprises:

means for generating minute time information corresponding to the timing symbol to which the long hand points and hour time information corresponding to the timing symbol to which the short hand points;

means for generating a variable whose value sequentially corresponds to each timing symbol;

first detection means for detecting a match between the value of the variable and the minute time information; and second detection means for detecting a match between the variable and the hour time information.

2. A display apparatus according to claim 1 wherein said control means further includes means, responsive to said first and second detecting means, for changing color signals of timing symbols either when said first detecting means detects a match between the corresponding value of the variable and the minute time information or when said second detecting means detects a match between the corresponding value of the variable and the hour time information.

3. A method for displaying an analog clock image having a plurality timing symbols and long and short hands for indicating a time with reference to the timing symbols, the method comprising the steps of:

generating hour time information corresponding to the timing symbol to which the short hand points and minute time information corresponding to the timing symbol to which the long hand points;

generating a variable whose value sequentially corresponds to each timing symbol;

detecting a match between the hour time information and a value of the variable to thereby identify a first timing symbol;

detecting a match between the minute time information and a value of the variable to thereby identify a second timing symbol;

producing control signals representing an analog clock image whereby colors of the first and second identified timing symbols differ from other timing symbols and;

displaying the analog clock image represented by the control signals on a screen.

4. A method according to claim 3 wherein a color of the first timing symbol differs from a color of the second timing symbol.

* * * * *